No. 844,726. PATENTED FEB. 19, 1907.
W. HUNTER.
FENCE POST SETTING TOOL.
APPLICATION FILED JUNE 27, 1906.
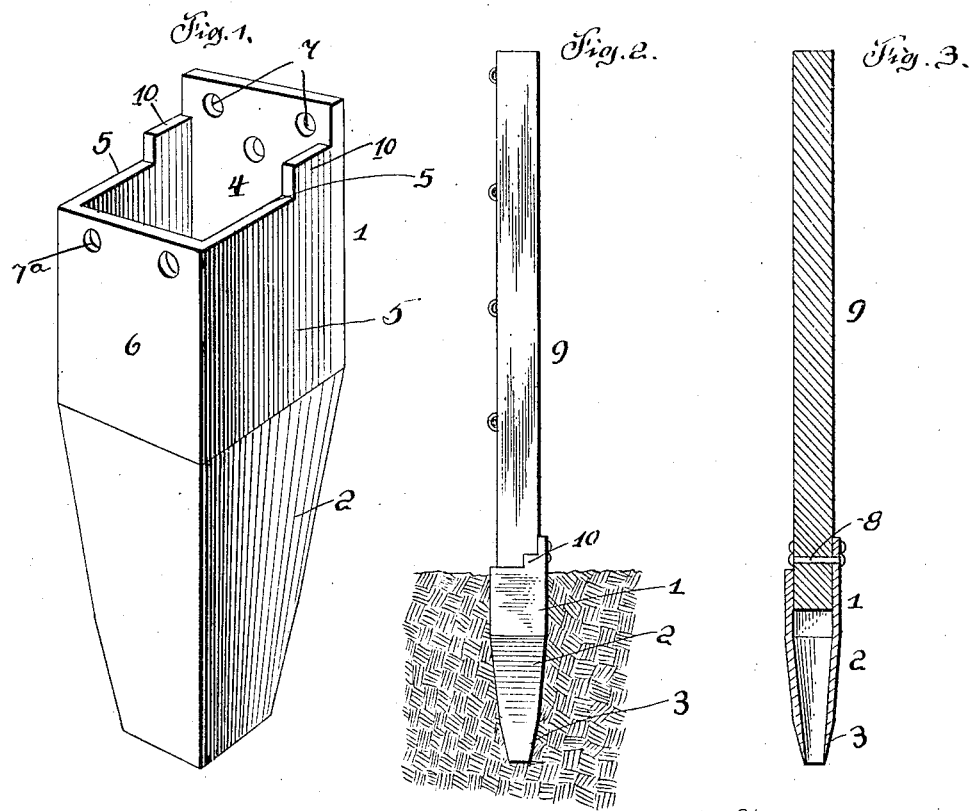
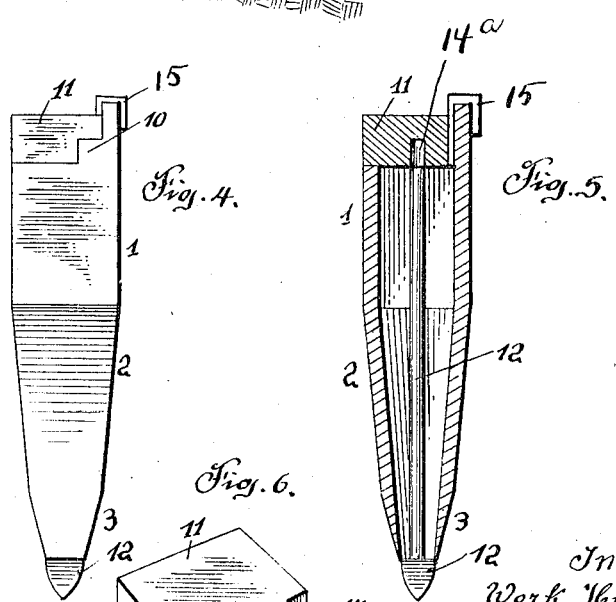
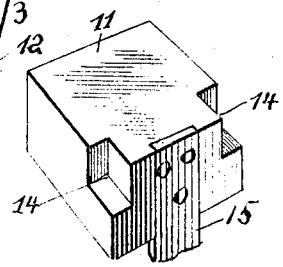
Witnesses:
Jesse C. Miller
P. H. Butler
Inventor
Work Hunter
by H. C. Evert & Co.
Attorneys.

UNITED STATES PATENT OFFICE.

WORK HUNTER, OF BUFFALO, PENNSYLVANIA.

FENCE-POST-SETTING TOOL.

No. 844,726.

Specification of Letters Patent.

Patented Feb. 19, 1907.

Application filed June 27, 1906. Serial No. 323,697.

*To all whom it may concern:*

Be it known that I, WORK HUNTER, a citizen of the United States of America, residing at Buffalo, in the county of Washington and State of Pennsylvania, have invented certain new and useful Improvements in Fence-Post-Setting Tools, of which the following is a specification, reference being had therein to the accompanying drawings.

This invention relates to certain new and useful improvements in fence-post-setting tool, the object being to provide simple and effective means whereby a fence-post socket may be readily driven into the ground.

The construction of the improvement will be fully described hereinafter in connection with the accompanying drawings, which form a part of this specification, and its novel features will be defined in the appended claims.

In the drawings, Figure 1 is a perspective view of a fence post socket for which my improved driving device is especially adapted. Fig. 2 is a side elevation of the same with a post in position therein. Fig. 3 is a vertical section of the same. Fig. 4 is a side elevation of the socket with my improved driving device applied thereto. Fig. 5 is a vertical sectional view of the same; and Fig. 6 is a perspective view of the block used in connection with a socket, said view illustrating the under face of the block.

To put my invention into practice, I construct a socket of strong and durable metal, which is cast or drop-forged to form a rectangular casing or sleeve 1, having a tapering end 2, which is beveled, as at 3. The casing or sleeve 1 has its rear wall 4 protruding above the side walls 5 5 and the front wall 6 of said casing or sleeve. The rear wall is provided with a plurality of openings 7 to accommodate bolts 8 or similar fastening means employed for retaining a post 9 within the sleeve or casing. The post 9 is adapted to fit snugly within the casing or sleeve, and to brace the same therein I form the side walls 5 with upwardly-extending lugs 10, adapted to engage the sides of the post 9 and firmly hold the same within the socket.

In connection with the sockets I use a block 11 and spear 12. The block and spear are employed when the sockets are driven in the ground, the shank or stem of the spear being slightly longer than the socket, whereby the head of the spear will form a pointed end upon the socket when said spear is placed in the socket, as illustrated in Fig. 5 of the drawings.

The block 11 has its under face cut away or recessed, as at 14, to accommodate the lugs 10 and provided with a recess 14ª to receive the upper end of the spear 12 when said block is placed upon the upper end of the socket. The block 11 is adapted to be struck by a sledge-hammer or a similar instrument when the socket is to be driven into the ground. After the socket has been properly positioned within the ground the block 11 is removed and the spear 12 withdrawn from the socket, said spear and block being used when placing other sockets in the ground. To retain the spear 12 in a perpendicular position within the socket, the rear wall of the block 11 is provided with a strap 15, adapted to engage over the upper edge of the rear wall 4.

The block and spear provide a simple and effective means for facilitating the driving of the socket into the ground, and for removing the sockets an ordinary jack stump-puller or similar device can be used, the device being attached to the socket at the openings 7 and openings 7ª, formed in the front wall 6 of the socket.

I do not care to confine myself to the size, proportion, or minor details of construction, and such changes as are permissible by the appended claims may be resorted to without departing from the spirit and scope of the invention.

What I claim, and desire to secure by Letters Patent, is—

1. A fence-post-setting tool consisting of a socket tapering in its lower part and open at both ends, and having the rear wall extended above the front wall and side walls and said side walls having lugs extending above the upper edge of the front wall, in combination with a removable driving-block adapted to rest on the upper edge of said front wall and side walls and having recesses to receive the lugs of said side walls, and a spear depending from said driving-block with the head thereof projecting through the open lower end of the socket.

2. A fence-post-setting tool consisting of a socket open at both ends and having one wall at the upper end of the socket extended above the other walls, in combination with a removable driving-block adapted to rest on the socket, a strap carried by said block to engage the extended wall of the socket and secure the block in position thereon, and a spear depending from the block with the head thereof extending through the open end of the socket.

3. A fence-post-setting tool consisting of a socket having a substantially rectangular upper portion and a tapering lower portion and open at both ends, the rear wall of said upper portion extending above the remaining walls, and lugs on the side walls of said upper portion, in combination with a driving-block adapted to engage said socket and having recesses to receive said lugs, means carried by said block to engage said upwardly-extended rear wall for securing the block thereon, and a spear depending from the block with the head thereof projecting through the open lower end of the socket.

In testimony whereof I affix my signature in the presence of two witnesses.

WORK HUNTER.

Witnesses:
W. R. McILVAINE,
J. F. BRISTOR.